United States Patent [19]

Tick

[11] Patent Number: 4,752,593
[45] Date of Patent: Jun. 21, 1988

[54] STABILIZED $CdF_2$-$PbF_2$-$AlF_3$-ALKALI FLUORIDE GLASSES

[75] Inventor: Paul A. Tick, Corning, N.Y.
[73] Assignee: Corning Glass Works, Corning, N.Y.
[21] Appl. No.: 60,152
[22] Filed: Jun. 10, 1987
[51] Int. Cl.⁴ .............................. C03C 3/32; C03C 4/10
[52] U.S. Cl. ........................................ 501/40; 501/904
[58] Field of Search ................................ 501/40, 904

[56] References Cited

U.S. PATENT DOCUMENTS

| | | | |
|---|---|---|---|
| 4,141,741 | 2/1979 | Lucas et al. | 501/40 |
| 4,308,066 | 12/1981 | Mitachi et al. | 501/40 |
| 4,537,864 | 8/1985 | Tick | 501/40 |

Primary Examiner—Mark L. Bell
Attorney, Agent, or Firm—Kees van der Sterre

[57] ABSTRACT

Metal halide glasses of $CdF_2$-$LiF$-$AlF_3$-$PbF_2$ composition but comprising KF and one or more of $LaF_3$ and $YF_3$ as stabilizers, and also including a minor amount of oxygen as a further stabilizer, exhibit excellent glass stability and low hydroxyl content as evidenced by high transmittance over the infrared wavelength range 2–6 microns.

3 Claims, 1 Drawing Sheet

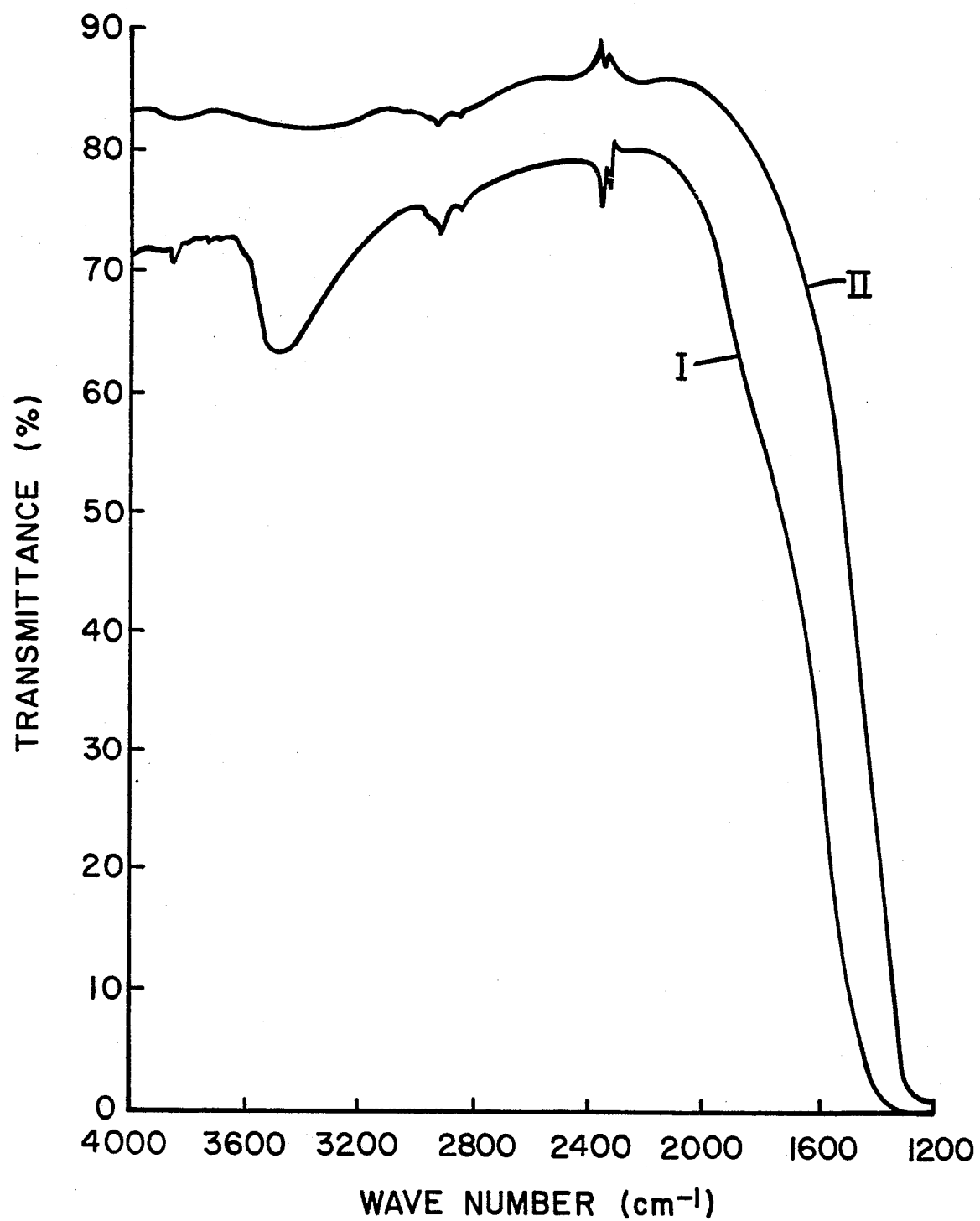

STABILIZED CDF₂-PBF₂-ALF₃-ALKALI FLUORIDE GLASSES

BACKGROUND OF THE INVENTION

The present invention relates to novel glass compositions, and more particularly to glasses formed of metal fluorides and exhibiting desirable optical properties and enhanced stability.

Although most of the glasses in commercial use are characterizable as oxide glasses, i.e., formed by the fusion of mixtures of oxides, glasses based on metal halides are also well known. Perhaps the best known glass forming metal halide is $BeF_2$, which forms a relatively stable glass when fused alone. But $BeF_2$ itself, which is also a component of many of the more stable halide glasses, is both hygroscopic and highly toxic.

Fluoride compositions providing alternatives to the use of $BeF_2$ include those described, for example, in U.S. Pat. No. 4,141,741. That patent describes glasses based on $ZrF_4$ and comprising additional constituents such as $BaF_2$ and $ThF_4$ which exhibit the desirable infrared transparency characteristic of many fluoride glasses and which are, in addition, non-hygroscopic. Further, U.S. Pat. No. 4,308,066 describes fluoride glasses based on $ZrF_4$ and/or $AlF_3$ which will form glasses if rapidly quenched. These glasses include, as further constituents, fluorides such as $CaF_2$, $SrF_2$, $BaF_2$ and/or $PbF_2$. All of these glasses generally share a short working range and are prone to devitrification.

Additional fluoride glasses comprising $ZrF_4$ have been described by M. Matecki et al, *Mat. Res. Bull.*, 17, pages 1035–1043 (1982). These are $ThF_4$–$ZrF_4$ glasses containing fluorides such as $LaF_3$, $YF_3$, $CdF_3$, $LuF_3$, and $ScF_3$. The glasses are reportedly relatively stable, exhibiting glass transition temperatures of 460°–515° C., and exhibit good infrared transparency.

Glasses based on fluorides other than $ZrF_4$ have also been reported. Hence, S. Shibata et al, *Mat. Res. Bull.*, 15, pages 129–137 (1980), describe a family of $PbF_2$-based fluoride compositions which will form glasses if rapidly quenched. Further, M. Matecki et al, *Mat. Res. Bull.*, 17, pages 1275–1281 (1982) have reported $CdF_2$-based glasses containing $BaF_2$ or a combination of $BaF_2$ and $ZnF_2$ which can form thin infrared transmitting glass if rapidly quenched. Optional constituents of these glasses include $AlF_3$, $YbF_3$, $ThF_4$, and/or alkali metal fluorides.

More recently, stable halide glasses have been reported in the $CdF_2$-$AlF_3$-$PbF_2$ system. Hence U.S. Pat. No. 4,537,864 reports $CdF_2$-$AlF_3$-$PbF_2$ glasses, preferably also including LiF, which exhibit good glass stability and relatively low glass transition temperatures. These glasses may contain optional constituents such as NaF, $ZnF_2$, $CaF_2$, $SrF_2$, $BaF_2$, $YbF_3$ and KF; however, only $YbF_3$ and KF may be introduced in significant proportions without some destabilization of the glass.

Glasses such as reported in U.S. 4,537,864 are of particular interest where high purity is demanded in the halide glass, because each of the constituents of the base glass is potentially vapor transportable. Hence impurities such as the transition metals and other species, which undesirably lower the transparency of the glass, can be largely excluded by vapor phase processing. However, the region of best glass stability in this system is not large, and composition modifications which could improve the stability of the glass and/or the transparency thereof would be desirable.

SUMMARY OF THE INVENTION

The present invention provides halide glasses of alkali fluoride-$CdF_2$-$AlF_3$-$PbF_2$ composition which exhibit improved glass stability and also very low attenuation due to hydroxyl species present in the glass. Metal halide glasses provided in accordance with the invention consist essentially, in mole percent, of about 20–33% $CdF_2$, 28–34% $AlF_3$, 27–32% $PbF_2$, 5–10% LiF, 2–6% KF, 0–10% $LaF_3$, 0–10% $YF_3$, and 2–8% total of $LaF_3$ + $YF_3$.

An essential additional constituent of these glasses is oxygen. Although present only as a minor constituent (typically 0.5–1.5% by weight of the glass), it has been unexpectedly found that this element has a strong effect on the stability of glasses in this system, providing glasses of improved clarity and transparency over a wider range of halide composition than could otherwise be achieved.

An unexpected advantage of halide glasses provided in accordance with the invention is significantly improved transparency at infrared wavelengths, where hydroxyl groups normally cause substantial light attenuation. Hence glasses within the above-described composition region can exhibit very low hydroxyl (water) attenuation, as measured by infrared spectral attenuation analysis, when compared with LiF-$CdF_2$-$AlF_3$-$PbF_2$ glasses typical of the prior art.

DESCRIPTION OF THE DRAWING

The invention can be further understood by reference to the drawing, which consists of an infrared absorption diagram plotting the absorption characteristics of a prior art halide glass and of a halide glass provided in accordance with the invention.

DETAILED DESCRIPTION

The proportions of the major glass forming constituents $CdF_2$, $AlF_3$, and $PbF_2$ present in the glasses of the invention fall generally within the glass-forming region disclosed in U.S. Pat. No. 4,537,864. Glasses of the present invention, however, are characterized by the essential presence of specified alkali metal fluorides and Group IIIB metal fluorides, which fluorides significantly enhance the stability of the resulting glasses, and by the inclusion of controlled amounts of oxygen.

The glasses of the invention are relatively stable, producing essentially crystal-free glass patties when formed by casting to thicknesses of up to about a centimeter on stainless steel plate. And even in novel compositions of less than optimum glass-forming stability, crystal-free glass products can readily be formed by moderate quenching of the molten glass.

The essential alkali metal fluoride constituents of the glasses of the invention are LiF and KF. The stabilizing effect of LiF is known, but KF had previously been considered to be a neutral additive, i.e., a constituent which could be introduced in moderate amounts without degrading stability, but which did not have any noticeable stabilizing effect.

It has now been determined that the use of KF in combination with specified proportions of the Group IIIB metal fluorides $YF_3$ and $LaF_3$ provides a distinct stabilizing effect on the glass. This is in contrast to other alkali metal fluorides such as NaF which are still considered destabilizing additives in this halide glass composition system.

The Group IIIB metal fluorides $YF_3$ and $LaF_3$ again appear somewhat unique in their stabilizing characteristics in this system. It appears that either or both of these fluorides may be employed to achieve the desired stabilizing effect provided their total concentration falls within the range of about 2–8 mole percent. Again, this is in contrast to the effect of Group IIIA metal fluorides such as $InF_3$ and $GaF_3$ which had previously been found to have strong destabilization effects in this base glass system.

Particularly unexpected is the effect of minor proportions of oxygen on glass stability in this family of halide glass compositions. Whereas it had previously been considered that oxygen was an undesirable impurity which limited glass forming behavior in the $CdF_2$-$AlF_3$-$PbF_2$ system, and which was desirably excluded, it has now been determined that oxygen is required to produce stable glasses of this type.

The effect of oxygen in quaternary glasses in the $CdF_2$-$LiF$-$AlF_3$-$PbF_2$ system can easily be demonstrated. Table I below reports the effect of oxygen concentration on the stability of a glass consisting, in mole percent, of about 10% $LiF$, 34.5% $AlF_3$, 33.5% $PbF_2$ and 22% $CdF_2$, as determined by a molten glass forming experiment. Six glass melts having this approximate composition, but varying slightly in oxygen content due to a partial substitution of $CdO$ for $CdF_2$ in the batch, are melted and formed by casting to a thickness of about 10 millimeters on stainless steel plate. The oxygen concentration in these glasses ranges from about 0.2% to about 1.5% by weight.

Included in Table I for each of the six different glasses are the oxygen content of each glass and the appearance of each of the cast glass samples. Glass quality, which directly correlates with glass stability, ranges from significantly crystallized glass at the lower end of the oxygen concentration range to phase-separated glasses at the higher end of the range, with the best quality being evidenced at moderate oxygen concentrations.

TABLE I

| Glass Quality (22 $CdF_2$-10$LiF$-34.5 $AlF_3$-33.5 $PbF_2$) | | |
|---|---|---|
| Example No. | Oxygen Level (% wt.) | Glass Quality |
| A | 0.20 | crystallized |
| B | 0.50 | partly crystallized |
| C | 0.75 | partly crystallized |
| D | 0.99 | clear |
| E | 1.11 | clear |
| F | 1.44 | opal (phase separated) |

As the data in Table I indicate, simple 4-component glasses in the composition system studied, when formed by a slow-cooling process such as casting, will form perfectly clear glasses only over a relatively narrow range of oxygen concentration.

Analogous behavior can be observed in the glasses of the present invention. While glasses can be formed in compositions comprising KF and either or both of $YF_3$ and $LaF_3$ as stabilizers, the addition of a minor oxygen component to the composition appears to further stabilize the glass, and is an important constituent contributing to the ability of these glasses to form high quality glass castings.

Table II below reports a series of three glass composition examples containing KF, $YF_3$, and oxygen over a range of increasing oxygen levels, and the appearance of samples of such glasses formed by casting to about 10 mm thickness from melts of the reported compositions. The proportions of the major fluoride ingredients are reported in moles, but total approximately 100 and thus correspond approximately to mole percent. Oxygen is reported in weight percent, and is considered to be present in partial substitution for fluorine in the glass structure.

Oxygen is conveniently introduced into glasses such as reported in Table II by partially replacing $CdF_2$ with $CdO$ on a mole-for-mole basis. This does not change the cadmium concentration and therefore the proportion of $CdF_2$, as calculated or analyzed on a fluoride basis from the cadmium content of the glass, remains unchanged. The $CdF_2$ values reported in Table II reflect the total cadmium content from both oxide and fluoride sources, but the amount of oxide included in the fluoride total for each glass is also reported.

The series of glasses in Table II indicates the clear trend toward improved glass quality with increased oxygen content. However, as in the simple four-component system of Table I, excess oxygen destabilizes these compositions and permits devitrification to occur in the course of forming.

TABLE II

| | Glass Quality | | |
|---|---|---|---|
| Composition | 1 | 2 | 3 |
| $CdF_2$ | 24 | 24 | 24 |
| ($CdO$) | (0) | (5) | (10) |
| $AlF_3$ | 32.5 | 32.5 | 32.5 |
| $PbF_2$ | 28 | 28 | 28 |
| LiF | 5 | 5 | 5 |
| KF | 4 | 4 | 4 |
| $YF_3$ | 6.5 | 6.5 | 6.5 |
| Cast Appearance | many crystals | few crystals | no crystals |
| Oxygen Content (% wt.) | 0 | 0.55% | 1.2% |

Glasses provided in accordance with the invention may be suitably melted in an atmospherically controlled melting facility such as, for example, a dry box. Atmospheric control is important in order to control the oxygen content and moisture content of the resulting glasses. These glasses are preferably melted under a nitrogen atmosphere, most preferably an atmosphere comprising less than about 10 ppm $O_2$ and less than 1 ppm $H_2O$.

Where hygroscopic or air-reactive fluorides such as $AlF_3$ or $CdF_2$ are to be used as batch ingredients, these constituents should be placed in the dry box unopened. The more stable fluorides can be exposed to the open atmosphere before use.

Batches for the glasses, generally consisting essentially of the pure metal fluorides to be included in the glass, can be prepared in the dry box, blended by hand tumbling, and melted in platinum crucibles or other suitable containers. Melting may be carried out at temperatures up to about 1100° C. in any suitable melting unit, such as a tube furnace. The melts are normally sufficiently fluid that only a brief hold at the melting temperature is needed to obtain a clear, bubble-free melt. The molten glasses can then be formed into glass products by casting or other suitable forming processes.

Examples of additional fluoride compositions suitable for providing glasses in accordance with the invention are reported in Table III below. The fluoride components of the compositions in Table III are again reported in molar proportions (number of moles), but total approximately 100 and can be deemed substantially equivalent to mole percent. Also reported in Table III for each of the glasses shown is an indication of the quality of a glass casting formed by pouring each glass melt into a stainless steel mold to a thickness of about 10 millimeters.

The incorporation of oxygen into the glasses reported in Table III is again primarily accomplished by means of a partial substitution of CdO for $CdF_2$ as a batch ingredient in the glass. As noted, this provides one direct way of controlling the level of oxygen in the glass, although as hereinafter described other oxide-for-fluoride substitutions or even atmospheric control may alternately be used for the same purpose. The $CdF_2$ levels reported in Table III reflect the total cadmium content from both oxide and fluoride sources as in Table II, but again the oxide content is also separately reported on a molar basis.

The oxygen levels resulting from the CdO substitutions in each glass are reported in weight percent, and take into account only the oxygen introduced into the glass via the CdO batch ingredient. Analyzed oxygen values are parenthetically given for two of the examples (compositions 2 and 5), and are found to be somewhat higher than the batched values. This is attributed to tramp oxygen entering the batch via other batch components.

TABLE IV

| Composition | Glass Compositions (moles) | | |
|---|---|---|---|
| | 8 | 9 | 10 |
| $CdF_2$ | 24 | 29.5 | 29.5 |
| LiF | 5 | 5.5 | 5.5 |
| $AlF_3$ | 32.5 | 31.5 | 31.5 |
| $PbF_2$ | 28.0 | 27.5 | 27.5 |
| KF | 4 | 3 | 3 |
| $YF_3$ | 6.5 | 3 | — |
| $LaF_3$ | — | — | 6 |

The estimated oxygen level in the glasses shown in Table IV lies between 1 and 1.5% by weight. The importance of impurity oxygen in these glasses is shown by the fact that a glass having the composition of Example 8 of Table IV, but formulated utilizing a relatively pure $AlF_3$ batch component (containing only about 0.17% oxygen by weight), shows a substantial tendency toward devitrification when cast as above described.

Variations in melting conditions employed in preparing glasses in accordance with the invention do not have a significant effect on the concentrations on most of the halide constituents in the glass. At melting temperatures in the 1000°–1100° C. range, only KF shows substantial volatilization losses [approximately 40% KF retention in open crucible melts], but this effect is relatively stable and reproducible over the preferred range of melting temperatures. $PbF_2$ shows a slight volatilization tendency, but only at the higher melting temperatures in this range.

As previously noted, an unexpected and particularly advantageous characteristic apparently common to glasses within the scope of the present invention is a markedly reduced level of hydroxyl absorption by the

TABLE III

| | Glass Compositions (moles) | | | | | | |
|---|---|---|---|---|---|---|---|
| | 1 | 2 | 3 | 4 | 5 | 6 | 7 |
| Composition | | | | | | | |
| $CdF_2$ | 24 | 24 | 20.4 | 20.4 | 24 | 24 | 24 |
| (CdO) | (2) | (4) | (11.1) | (11.1) | (6) | (12) | (18) |
| LiF | 5 | 5 | 9.3 | 9.3 | 5 | 5 | 5 |
| $AlF_3$ | 32.5 | 32.5 | 31.8 | 31.8 | 32.5 | 32.5 | 32.5 |
| $PbF_2$ | 28.0 | 28.0 | 31.0 | 31.0 | 28.0 | 28.0 | 28.0 |
| KF | 4 | 4 | 4.7 | 4.7 | 3 | 3 | 4 |
| $YF_3$ | 6.5 | 6.5 | 4 | — | 3 | — | 6.5 |
| $LaF_3$ | — | — | — | 4 | — | 6 | — |
| Batch Oxygen (% wt) | 0.2% | 0.44% (0.63) | 1.21% | 1.21% | 0.67% (0.81) | 1.29% | 1.92% |
| Glass Appearance | crystals | clear | clear | clear | clear | clear | opalescent |

Again the results shown in Table III indicate a strong interaction between glass quality and oxygen content. Composition 1 in Table III, which at 10 mm thickness produces a casting containing many crystals, is judged to be too low in oxygen for optimum stability, while Composition 7, which produces a phase-separated or opal glass, is too high. Compositions 2–6 form generally clear glasses, containing only a few small crystals.

As previously suggested, levels of impurity oxygen have a significant effect on these glasses, in some cases being sufficient to have a substantial stabilizing effect. Table IV below sets forth additional compositions within the scope of the invention, containing no added CdO but being formulated with an $AlF_3$ batch ingredient containing about 1.7% oxygen by weight as an impurity. These glasses exhibit good resistance to devitrification and can be poured to yield good quality castings at thicknesses below about 10 mm.

glass. Hence, when subjected to infrared spectral analysis in the wavelength region where absorption due to the presence of hydroxyl ions in these glasses can be observed, it is found that glasses containing added stabilizers in accordance with the invention appear relatively free of water or other OH species. This is in clear contrast to prior art glasses in the $CdF_2$-LiF-$AlF_3$-$PbF_2$ composition system, which may exhibit rather large attenuation due to hydroxyl or water.

The difference in infrared spectral attenuation in these two types of glasses is illustrated in the drawing, which consists of transmittance plots for each of a prior art fluoride glass and a fluoride glass provided according to the invention, as plotted over a wavelength range corresponding to about 2–7 microns (wave numbers of 4000–1200 cm$^{-1}$). Infrared absorption due to hydroxyl in these glasses is manifested by relatively strong attenuation of the infrared signal at a wave number of approximately 3448 cm$^{-1}$.

A good relative measure of the absorption due to hydroxyl in glasses, commonly referred to as the $\beta_{OH}$ coefficient of the glass, can be calculated by the relationship between the transmittance of the glass at 3448 cm$^{-1}$ and the transmittance at 3846 cm$^{-1}$ The coefficient is calculated according to the following expression:

$$\beta_{OH} = \frac{1}{d} \log \frac{T(3846)}{T(3448)}$$

wherein d is the sample thicknesses, T(3846) is the percent transmittance of the sample at 3846 cm$^{-1}$, and T(3448) is the percent transmittance of the sample at 3448 cm$^{-1}$.

Curve I of the drawing is an infrared spectral transmittance curve for a sample of a prior art glass having a composition of about 23% CdF$_2$, 9.5% LiF, 36% AlF$_3$ and 31.5% PbF$_2$. This glass was prepared with an AlF$_3$ batch material such as used to make the glasses reported in Table IV. The level of hydroxyl for this sample, shown by the strong absorption of infrared radiation at 3448 cm$^{-1}$, yields a B$_{OH}$ value of about 0.0074.

In contrast, a halide glass provided in accordance with the invention, consisting in mole percent of about 32.5% AlF$_3$, 5% LiF, 28% PbF$_2$, 4% KF, 24% CdF$_2$, and 6.5% YF$_3$, and including about 0.5% by weight of oxygen, exhibits an infrared spectral transmittance curve corresponding to the curve shown as curve II in the drawing. The markedly reduced hydroxyl attenuation of this glass at 3448 cm$^{-1}$, when compared with the glass of curve I from the prior art, is evident. This reduction in hydroxyl concentration yields a $\beta_{OH}$ value of approximately 0.0012 mm$^{-1}$ for the glass of the invention. Glasses having $\beta_{OH}$ values below about 0.002 are considered to be routinely attainable within the range of compositions useful according to the invention.

The reason for the markedly reduced hydroxyl absorption shown in these glasses is not fully understood, although reduced surface absorption is presently believed to be a major factor. The effect may perhaps be due to improved resistance to surface hydration. In any event, the freedom from infrared absorption in this wavelength range has obvious advantages for a wide variety of optical applications wherein good transparency in the 2–7 micron infrared wavelength range is desired.

Based on data such as reported above, a preferred range of halide glass compositions for use in accordance with the invention comprises glasses consisting essentially, in mole percent, of about 20–29.5% CdF$_2$, 28.5–32.5% AlF$_3$, 27.5–31.5% PbF$_2$, 5–9.3% LiF, 3.0–4.7% KF, 0–6.5% YF$_3$, 0–6.5% LaF$_3$, and 3–6.5% total of YF$_3$+LaF$_3$. These preferred glasses must include oxygen as a stabilizer in an amount of about 0.5–1.5% by weight of the glass, taking account of all sources of oxygen in the batch including that introduced as batch constituent impurities.

I claim:

1. A metal halide glass consisting essentially, in mole percent, of about 20–33% CdF$_2$, 28–34% AlF$_3$, 25–35% PbF$_2$, 5–10% LiF, 2–6% KF, 0–8% LaF$_3$, 0–8% YF$_3$, and 2–8% total of LaF$_3$+YF$_3$, said glass further containing an oxygen stabilizer constituting 0.5–1.5% by weight of the glass.

2. A metal halide glass in accordance with claim 1 which contains, in mole percent, 20–29.5% CdF$_2$, 28.5–32.5% AlF$_3$, 27.5–31.5% PbF$_2$, 5–9.3% LiF, 3.0–4.7% KF, 0–6.5% YF$_3$, 0–6.5% LaF$_3$, and 3–6.5% total of YF$_3$+LaF$_3$.

3. A metal halide glass in accordance with claim 1 which exhibits a $\beta_{OH}$ value not exceeding about 0.002.

* * * * *